(12) United States Patent
Jones et al.

(10) Patent No.: US 10,242,141 B2
(45) Date of Patent: Mar. 26, 2019

(54) RESET SEQUENCING FOR REDUCING NOISE ON A POWER DISTRIBUTION NETWORK

(71) Applicant: Altera Corporation, San Jose, CA (US)

(72) Inventors: Jakob Raymond Jones, San Jose, CA (US); Tim Tri Hoang, San Jose, CA (US); Ben Chunben Wang, San Jose, CA (US)

(73) Assignee: Altera Corporation, San Jose, CA (US)

( * ) Notice: Subject to any disclaimer, the term of this patent is extended or adjusted under 35 U.S.C. 154(b) by 45 days.

(21) Appl. No.: 15/277,414

(22) Filed: Sep. 27, 2016

(65) Prior Publication Data
US 2018/0089355 A1   Mar. 29, 2018

(51) Int. Cl.
*G06F 17/50* (2006.01)
(52) U.S. Cl.
CPC ........ *G06F 17/5054* (2013.01); *G06F 17/505* (2013.01); *G06F 2217/78* (2013.01); *G06F 2217/82* (2013.01)
(58) Field of Classification Search
CPC ............... G06F 17/5054; G06F 17/505; G06F 2217/82; G06F 2217/78
See application file for complete search history.

(56) References Cited

U.S. PATENT DOCUMENTS

| | | | |
|---|---|---|---|
| 6,321,369 B1 | 11/2001 | Heile et al. | |
| 8,151,233 B1 | 4/2012 | Azizi et al. | |
| 9,619,012 B2 * | 4/2017 | Magee | G06F 1/3287 |
| 2004/0172603 A1 | 9/2004 | Collmeyer et al. | |
| 2008/0263323 A1 * | 10/2008 | Mould | G06F 9/3836 712/42 |
| 2010/0017776 A1 | 1/2010 | Tabaru et al. | |
| 2010/0146338 A1 * | 6/2010 | Schalick | G06F 11/3648 714/33 |
| 2010/0264983 A1 * | 10/2010 | Nation | G06F 1/206 327/540 |

(Continued)

FOREIGN PATENT DOCUMENTS

WO   2012030787 A2   3/2012

OTHER PUBLICATIONS

PCT International Search Report & Written Opinion for PCT Application No. PCT/US2017/051840 dated Jan. 8, 2018; 11 Pages.

*Primary Examiner* — Nha T Nguyen
(74) *Attorney, Agent, or Firm* — Fletcher Yoder, PC (57) ABSTRACT

A computer-implemented method includes receiving a first circuit design for an integrated circuit device, determining when multiple power-drawing events are to occur at substantially the same time via one or more circuitry components of the integrated circuit device, which would have a disruptive effect on a power distribution network of the integrated circuit device, based on the first circuit design, and generating logic that schedules the more than one event so that the more than one event do not occur simultaneously. The logic is included in an event sequencer. The method also includes inserting the event sequencer into the first circuit design during compilation to create a second circuit design and outputting the second circuit design to be implemented on the integrated circuit device.

18 Claims, 11 Drawing Sheets

(56) References Cited

U.S. PATENT DOCUMENTS

| | | | |
|---|---|---|---|
| 2011/0095801 A1* | 4/2011 | Bjerregaard | G06F 1/10 |
| | | | 327/270 |
| 2016/0188469 A1* | 6/2016 | Nagarajan | G06F 12/0815 |
| | | | 710/308 |
| 2016/0191420 A1* | 6/2016 | Nagarajan | H04L 45/7453 |
| | | | 370/389 |
| 2017/0099619 A1* | 4/2017 | Yin | H04W 36/0072 |
| 2017/0155544 A1* | 6/2017 | Khanna | H04L 41/0668 |
| 2017/0244391 A1* | 8/2017 | Wang | H03K 3/012 |
| 2017/0351578 A1* | 12/2017 | Cartes | G06F 11/004 |

* cited by examiner

RESET SEQUENCING FOR REDUCING NOISE ON A POWER DISTRIBUTION NETWORK

BACKGROUND

The present disclosure relates generally to integrated circuit devices that employ a power distribution network. More particularly, the present disclosure relates to reset sequencing of certain circuitry components that share the power distribution network to reduce power distribution noise.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—including computers, tablets, calculators, televisions, gaming devices, and mobile phones, to name just a few—operate using integrated circuit devices. Integrated circuit devices are made of many different circuitry components that may draw power from a shared power distribution network. For example, integrated circuit devices such as application-specific integrated circuits (ASICs) or programmable logic device (PLDs) may include, transceivers, digital signal processing (DSP) circuitry components, phase-locked loops (PLLs), and/or dynamic random access memory (DRAM) memory circuitry components, among others. During normal operation, the circuitry components of the integrated circuit device may operate dynamically, drawing variable amounts of power from a shared power distribution network at various times. These dynamic events may produce voltage transients in the power distribution network. The dynamic events may include dynamic reset, dynamic circuit reconfiguration, external clock changes, and the like. Simultaneous dynamic events on multiple circuitry components may result in cumulative voltage transients large enough to cause circuit errors or failures in the circuitry components that share the power distribution network.

As an example, modern programmable logic devices, such as field programmable gate array (FPGA) or application specific integrated circuits (ASIC) devices, may contain many transceiver channels. In many device designs, it is not uncommon for these transceiver channels to be used orthogonally to each other. That is, several channels may be grouped together to form a peripheral circuitry component interconnect express (PCIe) interface while other channels may be used to support an Ethernet interface, and still other channels may be used to support Interlaken interfaces. Resetting or dynamically reconfiguring multiple channels in these interfaces may create enough of a power distribution network disturbance to create bit errors on the unrelated PCIe or Ethernet interfaces.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments relate to software programs, methods, and devices for reducing noise in a power distribution network using control logic that reduces the number or impact of substantially simultaneous events that draw power from the power distribution network. This may result in less noise on the power distribution network in the form of fewer or less powerful voltage transients. In some cases, the control logic may be inserted into a circuit design and any connections between the control logic and circuitry components may be established without user intervention. The control logic may effectively reduce noise in the power distribution network by scheduling or staggering the events so that they do not occur simultaneously.

Various refinements of the features noted above may be employed in relation to various aspects of the present disclosure. Further features may also be incorporated in these various aspects as well. These refinements and additional features may be employed individually or in any combination. For instance, various features discussed below in relation to one or more of the illustrated embodiments may be incorporated into any of the above-described aspects of the present invention alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. The techniques presented and claimed herein are referenced and applied to material objects and concrete examples of a practical nature that demonstrably improve the present technical field and, as such, are not abstract, intangible or purely theoretical.

This disclosure relates to providing reset sequencing logic in a circuit design to reduce jitter or noise on a power distribution network of an integrated circuit. This may involve recognizing when reset sequencing logic is appropriate in a circuit design, generating the reset sequencing logic, inserting the reset sequencing logic, and establishing the connections between circuitry components and the reset sequencing logic. Reset sequencing logic may be appropriate when more than one dynamic event is expected to occur substantially simultaneously that may disrupt a power distribution network (e.g., cause noise). The dynamic events may include resetting more than one circuitry component simultaneously, dynamically reconfiguring a circuitry channel in a way that abruptly changes clock frequency, dynamically reconfiguring a phase-locked loop of the circuitry components in a way that abruptly changes clock frequency, and/or removal or restoration of a reference clock to the circuitry components. Although simultaneous resets are used as the primary example of power distribution network disturbance events herein, it should be noted that any event that draws a substantial amount of power and affects the power distribution network may be considered and alleviated by the sequencing logic generated. Accordingly, although a reset sequencer is described including reset sequencing logic below, it may be generally contemplated as an event sequencer with event sequencing logic.

Figure 1:
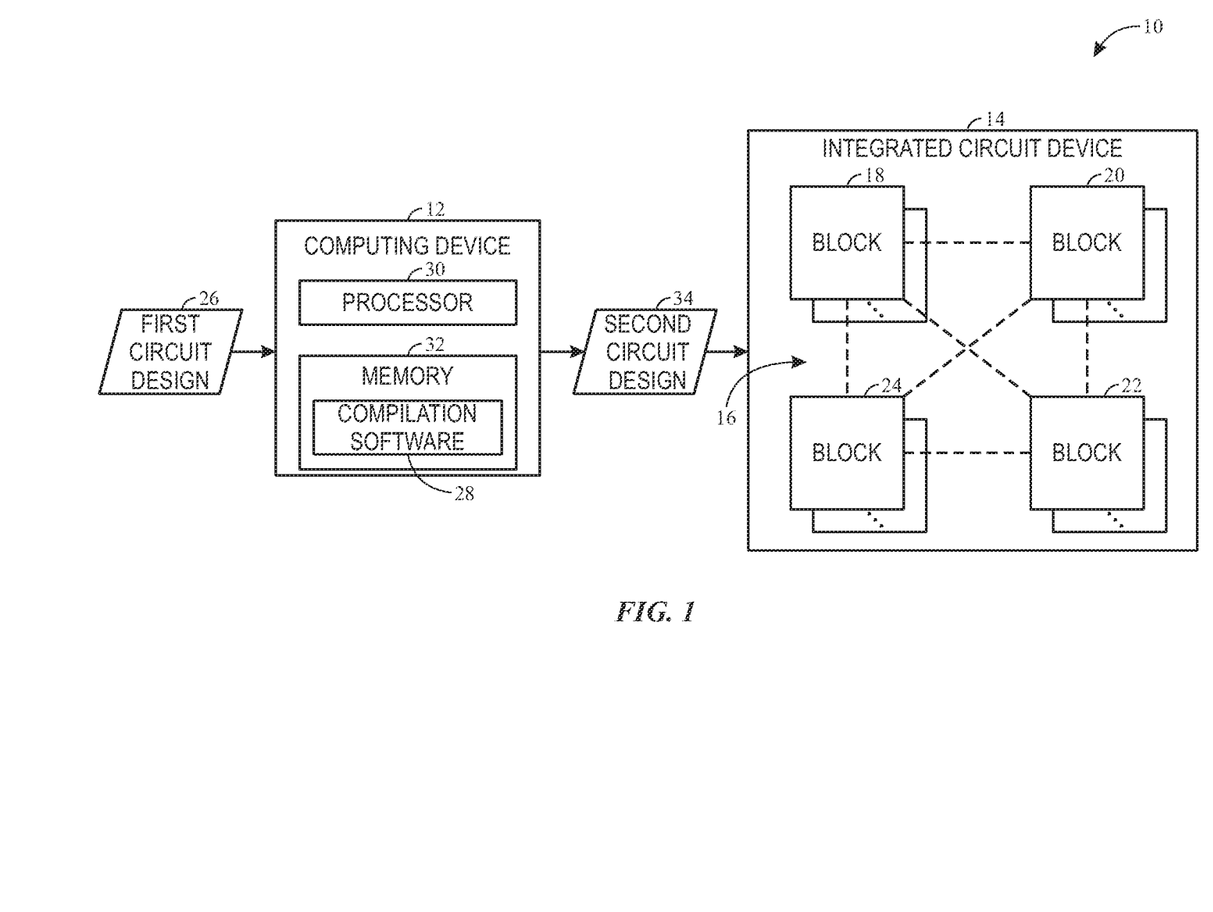
FIG. 1 is a block diagram of a system including a computing device that implements control circuitry on an integrated circuit device to reduce noise in a power distribution network shared by various circuitry components of the integrated circuit device, in accordance with an embodiment.

With the foregoing in mind, FIG. 1 is a block diagram of a system 10 including a computing device 12 that implements logic on an integrated circuit device 14 to reduce noise in a power distribution network 16 shared by various circuitry components 18, 20, 22, and 24 of the integrated circuit device 14, in accordance with an embodiment. In some embodiments, the integrated circuit device 14 may include a field programmable gate array (FPGA) and the circuitry components 18, 20, 22, and 24 may be circuitry components included on the integrated circuit device 14. In some embodiments, the circuitry components 18, 20, 22, and 24 may be integrated into the integrated circuit device 14 as hard intellectual property (IP) circuitry or as soft IP that is implemented in a circuit design. It should be noted that the integrated circuit device 14 may also include or represent an application specific integrated circuit (ASIC) in some embodiments.

There may be numerous instances of each circuitry component 18, 20, 22, and 24. Circuitry components 18 may include one or more transceivers, circuitry components 20 may include one or more digital signal processors (DSPs), circuitry components 22 may include phase-locked loops (PLLs), and circuitry components 24 may include hard dynamic random access memory (DRAM) memory controllers. It should be understood that the electronic device may not include the exact circuitry components 18, 20, 22, and 24 described above and different circuitry components may be included on the integrated circuit device 14. As illustrated, the multiple instances of the circuitry components 18, 20, 22, and 24 share the power distribution network 16 within the integrated circuit device 14. In certain situations, if dynamic events (e.g., dynamic reset, dynamic circuit reconfiguration, and/or external clock changes) occur simultaneously on more than one of the instances of the circuitry components 18, 20, 22, and/or 24, then undesirable voltage transients in the power distribution network 16 may cause circuit errors or failures in circuits sharing the power distribution network 16.

Accordingly, some embodiments of the present disclosure include recognizing when the dynamic events may occur simultaneously in a received first circuit design 26 (e.g., the user's circuit design) and generating logic to schedule and/or sequence the events to ensure that the events do not occur simultaneously. The logic (e.g., reset sequencing logic) may be generated by compilation software 28 executed by a processor 30. The compilation software 28 may be stored on a memory 32 of the computing device 12. The compilation software 28 may insert the logic into the first circuit design 26 during compilation to create a second circuit design 34 that is implemented on the integrated circuit device 14. The second circuit design 34 may control the number of simultaneous events occurring to reduce noise in the power distribution network 16 and inhibit circuit errors or failures.

The processor 30 may be any type of computer processor or microprocessor capable of executing computer-executable code. Moreover, the processor 30 may include multiple processors or microprocessors, one or more "general-purpose" processors or microprocessors, and/or one or more special-purpose processors or microprocessors, or some combination thereof.

The memory 32 may be any suitable article of manufacture that can serve as non-transitory computer-readable media to store processor-executable routines, code, data, or the like. The articles of manufacture may represent computer-readable media (e.g., any suitable form of memory or storage) that may store the processor-executable code or routines used by the respective processor 30 to perform the presently disclosed techniques. For example, the memory 32 may include volatile memory (e.g., a random access memory (RAM)), nonvolatile memory (e.g., a read-only memory (ROM)), flash memory, a hard drive, or any other suitable optical, magnetic, or solid-state storage medium, or a combination thereof.

In some embodiments, the compilation software 28 may provide multiple functionality to enable the disclosed techniques, such as: recognizing the presence of each reset endpoint instance in the first circuit design 26; collecting any relevant information about each reset endpoint instance; parameterizing and generating the reset sequencer to accommodate the reset endpoints found in the first circuit design 26; adding the generated reset sequencer to the first circuit design 26 during the initial stages of compilation (e.g., design elaboration, before synthesis) to create the second circuit design 34; making reset request and acknowledge connections between the reset sequencer and the reset endpoint instance; and continuing with normal synthesis, fit, place and route, timing closure activities, etc. Accordingly, it should be understood that the compilation software 28 may include functionality to generate and insert logic into circuit designs during compilation.

Figure 2:
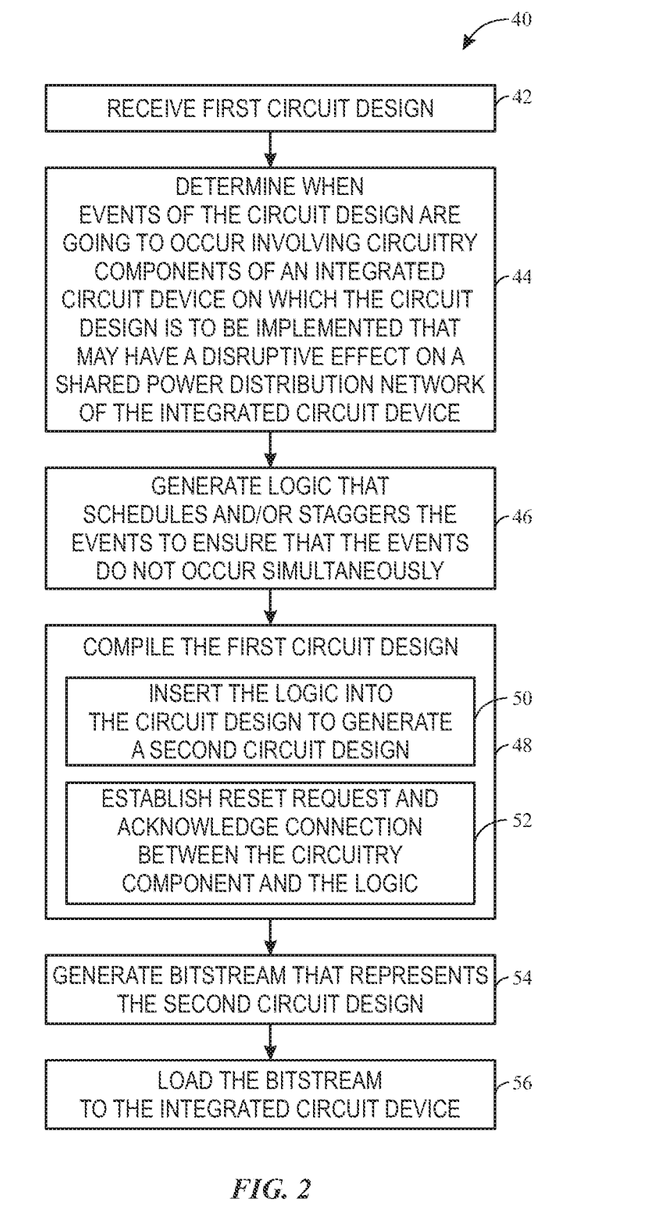
FIG. 2 is a flow diagram of a process for reducing noise in the power distribution network using reset sequencing, in accordance with an embodiment.

FIG. 2 is a flow diagram of a process 40 for reducing noise in the power distribution network 16 using reset sequencing, in accordance with an embodiment. Although the following description of the process 40 is described with reference to the processor 30 of the computing device 12, it should be noted that the method 40 may be performed by other processors disposed on other devices that may be capable of communicating with the integrated circuit device 14. Additionally, although the following process 40 describes a number of operations that may be performed, it should be noted that the process 40 may be performed in a variety of suitable orders and all of the operations may not be performed. Further, the process 40 may be implemented as computer instructions included in the compilation software 28 stored on the memory 32.

Referring now to the process 40, the processor 30 receives (block 42) the first circuit design 26 (e.g., user's circuit design). The first circuit design 26 may be entered on a graphical user interface of the compilation software 28 (e.g., computer aided design (CAD) tool), retrieved from the memory 26, or downloaded from an external source (e.g., server, external hard drive, etc.) over a network connection (e.g., the Internet, local area network (LAN), etc.).

The processor 30 may determine (block 44) when events of the first circuit design 26 are going to occur simultaneously involving the circuitry components 18, 20, 22, and/or 24 of the integrated circuit device 14 on which the first circuit design 26 is to be implemented that may have a disruptive effect on the shared power distribution network 16. The events that may be recognized by the processor 30 include, but are not limited to, dynamic reset, dynamic circuit reconfiguration, and/or external clock changes.

When it is determined that the events may occur simultaneously in the first circuit design 26, the processor 30 may generate (block 46) logic that schedules and/or staggers the events to ensure that the events do not occur simultaneously. In some embodiments, this step may include scheduling assertions and deassertions of resets so that they do not occur at the same time. Moreover, the processor 30 may schedule the assertions and deassertions at least a minimum time apart (e.g., 100 to 500 nanoseconds). As described in detail below, the logic may be embodied in a reset sequencer that is inferred by the compilation software 28 executed by the processor 30.

The processor 30 may compile (block 48) the first circuit design 26. Compilation may include inserting (block 50) the logic of the reset sequencer into the circuit design to generate the second circuit design 34. In addition, compilation may also include establishing (block 52) reset request and acknowledge connections between reset endpoints of the circuitry components 18, 20, 22, and/or 24 and the logic of the reset sequencer, as described in detail below. The processor 30 may generate (block 54) a bitstream that represents the second circuit design 34 and load (block 56) the bitstream to the integrated circuit device 14 for operation of the integrated circuit device 14.

Figure 3:
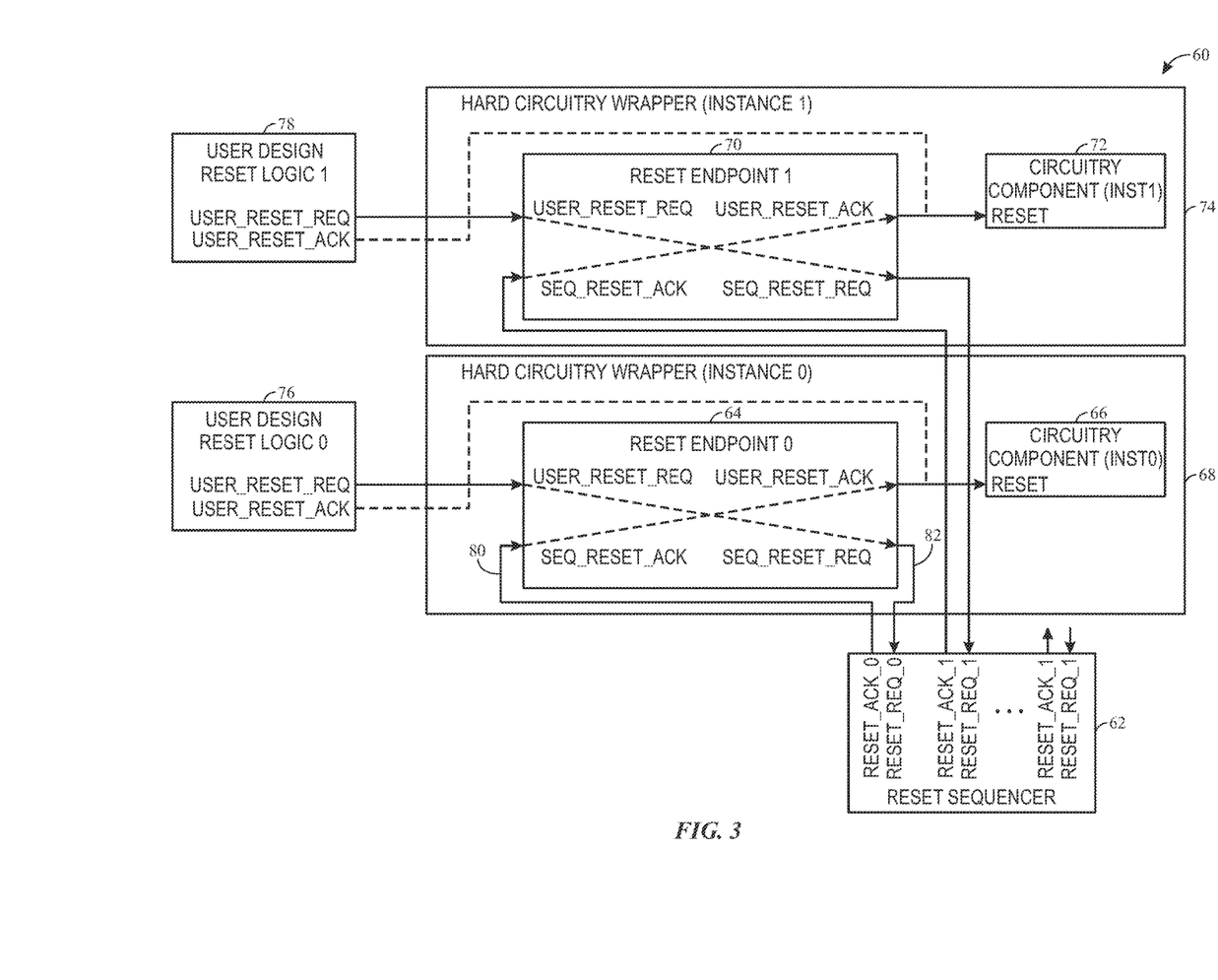
FIG. 3 is a block diagram of a circuit design that includes circuitry components used to implement the process of FIG. 2, in accordance with an embodiment.

FIG. 3 is a block diagram of a circuit design 60 (e.g., the second circuit design 34) that includes circuitry components used to implement the process 40 of FIG. 2, in accordance with an embodiment. For example, the circuit design 60 includes a reset sequencer 62 that is inferred by the compilation software, reset endpoint 64 and circuitry component 66 included in hard circuitry wrapper 68, reset endpoint 70 and circuitry component 72 included in hard circuitry wrapper 74, user design reset logic 76 associated with the hard circuitry wrapper 68, and user design reset logic 78 associated with the hard circuitry wrapper 74.

In some embodiments, the reset sequencer 62 is the top-level circuitry component that accepts reset assertion and deassertion requests, schedules the requests, and provides output back to the design logic for reset assertion and deassertion to the circuitry components. As discussed above, the reset sequencer 62 may be inserted automatically by the compilation software 28 during compilation. The reset sequencer 62 is synthesized into the integrated circuit device 14 (e.g., FPGA) fabric resources (e.g., look-up tables, registers, routing, etc.). Further, the reset sequencer 62 may be configurable to adapt to any number of circuitry components, and thus, reset connections, in the circuit design. As depicted, the reset sequencer 62 includes inputs for reset_req_0 to reset_req_n and outputs for rest_ack_0 to reset_ack_n. This parametrization takes place during compilation by the compilation software 28.

In some embodiments, the reset endpoints 64 and 70 are circuitry components in the electronic device's provided wrapper 68 and 74 of the circuitry components 66 and 72. The reset endpoints 64 and 70 may at least in part function as interfaces for connecting reset requests from the user design logic 76 and 78 to the reset sequencer 62. The reset endpoints 64 and 70 may also provide reset acknowledgements from the reset sequencer 62 back to the user design reset logic 76 and 78 and drive the actual reset signals to the circuitry components 66 and 72. As such, the reset endpoints 64 and 70 include connections to and from the user design reset logic 76 and 78, respectively, reset signals to and from the circuitry components 66 and 72, respectively, and request and acknowledgement signals intended for connection to and from the reset sequencer 62.

In some embodiments, the reset endpoints 64 and 70 are provided in the hard circuitry wrapper 68 and 74 by a vendor of the integrated circuit device 14. In some embodiments, the reset endpoints 64 and 70 may include just connections without logic. Additional logic may be added around the reset endpoints 64 and 70 in certain situations for complex reset sequences as desired by the application.

During compilation, the compilation software 28 recognizes each instance of the reset endpoints 64 and 70 and thereby triggers the creation and insertion of the reset sequencer 62. The compilation software 28 may make any connections between each instance of the reset endpoints 64 and 70 and the inserted reset sequencer 62 to control the events of the circuitry components 66 and 72 to reduce noise in the power distribution network 16. In general, the reset sequencer 62 accepts reset requests from the user design reset logic 76 and 78. The reset sequencer 62 then sequences the assertion and deassertion of reset outputs back to the user design reset logic 66 and 72, which may be connected directly to the reset inputs of the circuitry components 66 and 72. The reset sequencer 62 ensures that a characterized minimum separation time (e.g., based on hardware specification of the integrated circuit device 14) is enforced between assertion and deassertion events of any two resets across the integrated circuit device 14. Thus, in some embodiments, the reset signals from the user design reset logic 76 and/or 78 may be automatically connected to the reset sequencer 62 so that the reset sequencer 62 can sequence the resets to the circuitry components 66 and/or 72 channels without user intervention.

For example, the compilation software 28 that is executed by the processor 30 may connect the reset_ack_0 output to the seq_reset_ack input of the reset endpoint 64, as shown by line 80, and connect the seq_reset_req output of the reset endpoint 64 to the reset_req_0 input of the reset sequencer 62, as shown by line 82. Accordingly, when the user design reset logic 76 requests a reset, the request is sent to the user_reset_req input of the reset endpoint 64. The reset request is output by the seq_reset_req of the reset endpoint 64 to the reset_req_0 input of the reset sequencer 62. The reset sequencer 62 may receive numerous reset requests from other reset endpoints (e.g., reset endpoint 70) at substantially the same time (e.g., simultaneous). The reset sequencer 62 may schedule and/or stagger the reset events to ensure that they do not occur simultaneously. For example, the reset scheduler 62 may use round robin scheduling to stagger the reset events. When the resets are scheduled, the reset sequencer 62 may output a signal via the reset_ack_0 to the seq_reset_ack input of the reset endpoint 64. The signal may be output by the user_reset_ack to a reset input of the circuitry component 66 to cause assertion or deassertion of the reset at the scheduled time. The signal may also be output to the user_reset_ack input of the user reset design logic 76. It should be understood that the resets of the other circuitry components (e.g., circuitry component 72) may be similarly scheduled and controlled.

In some embodiments, the reset sequencer 62 may include additional functionality. For example, the reset sequencer 62 may accept requests from the reset endpoints 64 and 70, grant or acknowledge desired reset time to the reset endpoints 64 and 70, and continue to wait until the reset endpoints 64 and 70 deasserts the requests. This may enable variable reset control at the reset endpoints 64 and 70. Further, the reset sequencer 62 may be "endpoint aware" in that different reset endpoints 64 and 70 have different time or sequence specifications. These independent endpoint specifications may be passed to the reset sequencer 62 at generation time. Also, the reset sequencer 62 may produce a clock internally using available electronic device (e.g., FPGA) clock oscillator resources. Further, the reset sequencer 62 may receive a clock from an external source, and the clock source may be inferred and connected by the compilation software 28, which may be directed by user control, as described in more detail below.

To further describe generation of the second circuit design 34 including the reset sequencer, reset endpoints, connections between the reset sequencer and the reset endpoints, circuitry components, user design reset logic, and/or clocks, FIGS. 4-10 provide illustrative guidance. It should be noted that FIGS. 4-10 use a transceiver as an example of the circuitry component. Thus, the reset endpoints may be referred to as transceiver reset endpoints (TRE) and the reset sequencer may be referred to as transceiver reset sequencer (TRS) in FIGS. 4-10 and the following description, but it should be understood that any circuitry component may be used.

Figure 4:
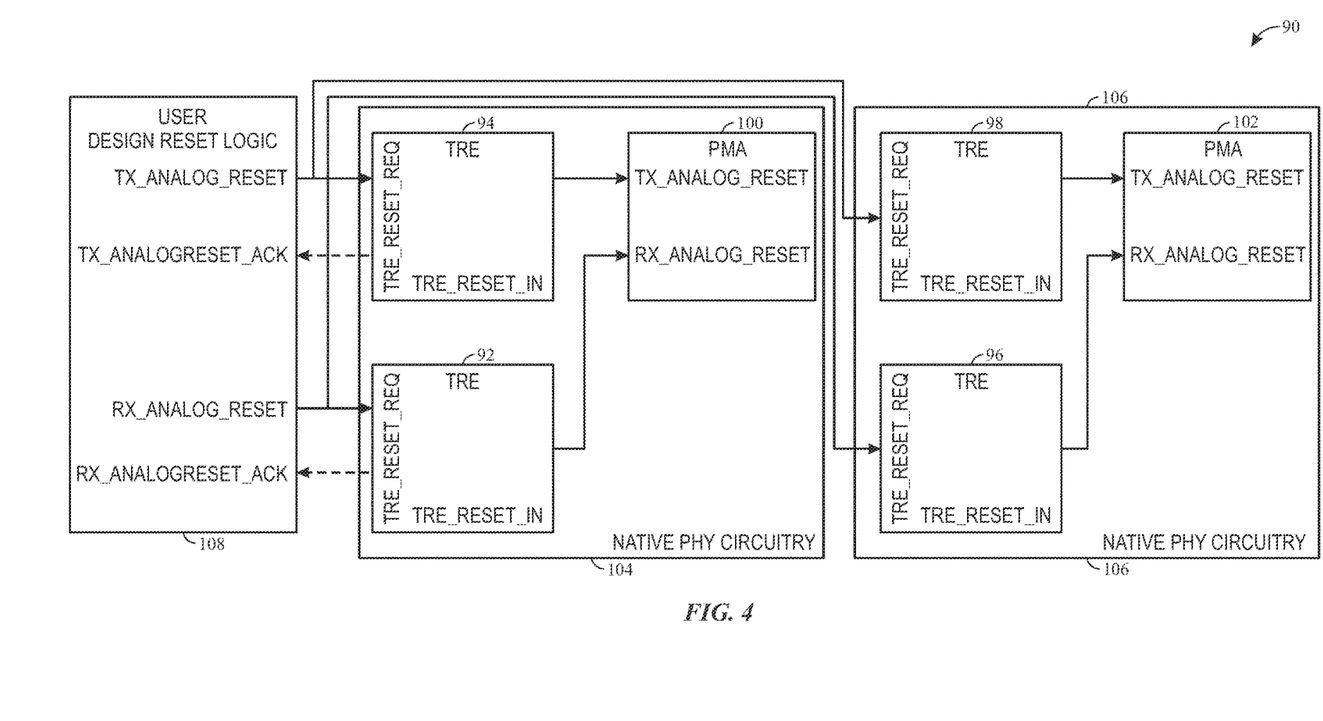
FIG. 4 is a block diagram of a circuit design that includes instantiated reset endpoints for analog reset inputs of a physical medium attachment in a native physical circuitry layer of an integrated circuit device, in accordance with an embodiment.

Turning to FIG. 4, a block diagram of a circuit design 90 prior to the reset sequencer 62 being inserted is depicted.

FIG. 4 illustrates transceiver reset endpoints (TREs) 92, 94, 96, and 98 instantiated for each analog reset input of a physical medium attachment (PMA) (e.g., circuitry component) 100 and 102 in a native physical (PHY) circuitry layer (e.g., hard circuitry wrapper) 104 and 106 of the integrated circuit device 14, in accordance with an embodiment. For example, PMA 100 includes two analog reset inputs, and thus, two TREs 92 and 94 instantiated in the native PHY circuitry layer 104. The native PHY circuitry layers 104 and 106 instantiate the TREs 92, 94, 96, and 98. Each of the TREs of each native PHY circuitry layer 104 and 106 are connected to a respective analog reset input of the PMAs 100 and 102, respectively. For example, TRE 94 is connected to tx_analog_reset input of the PMA 100, and TRE 92 is connected to rx_analog_reset input of the PMA 100. Further, each TRE accepts the reset inputs from the user design reset logic 108 or from the circuitry's reset logic.

Figure 5:
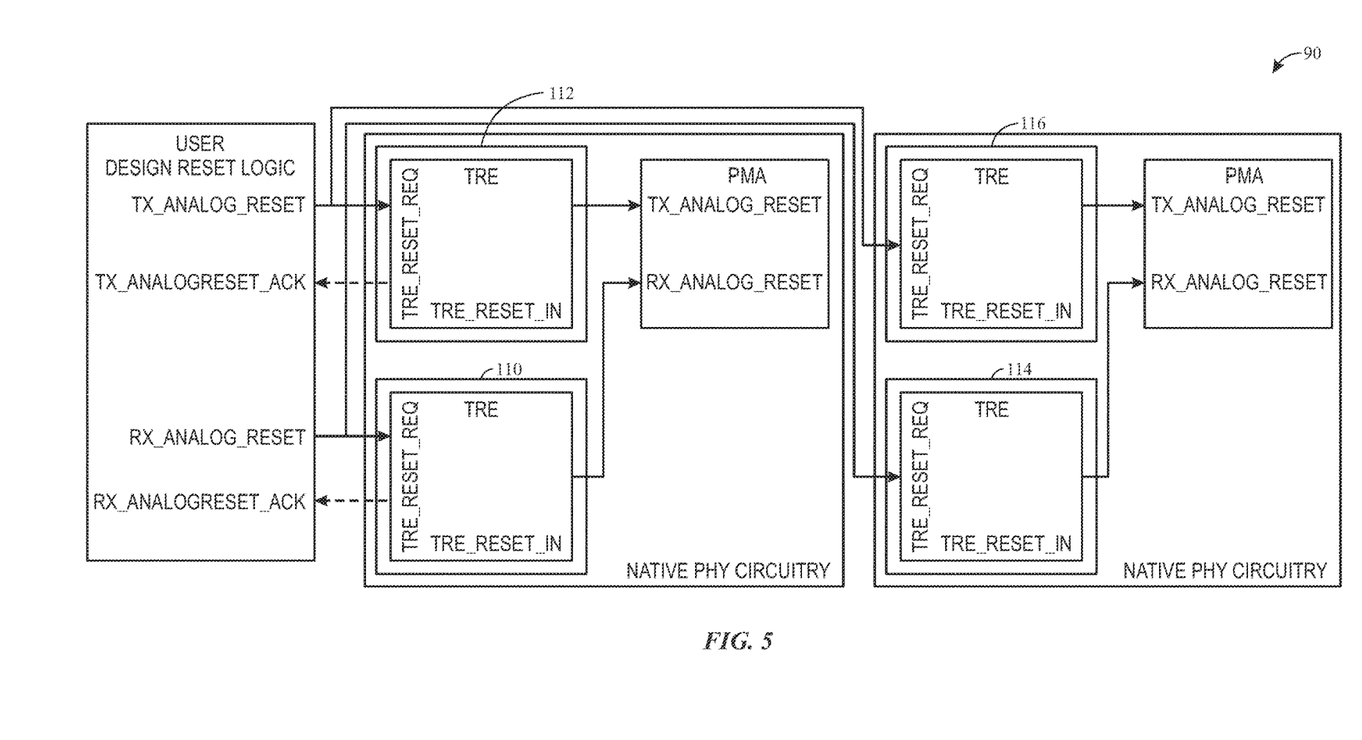
FIG. 5 is a block diagram of the circuit design of FIG. 4 where the compilation software has detected the reset endpoints during synthesis, in accordance with an embodiment.
Figure 6:
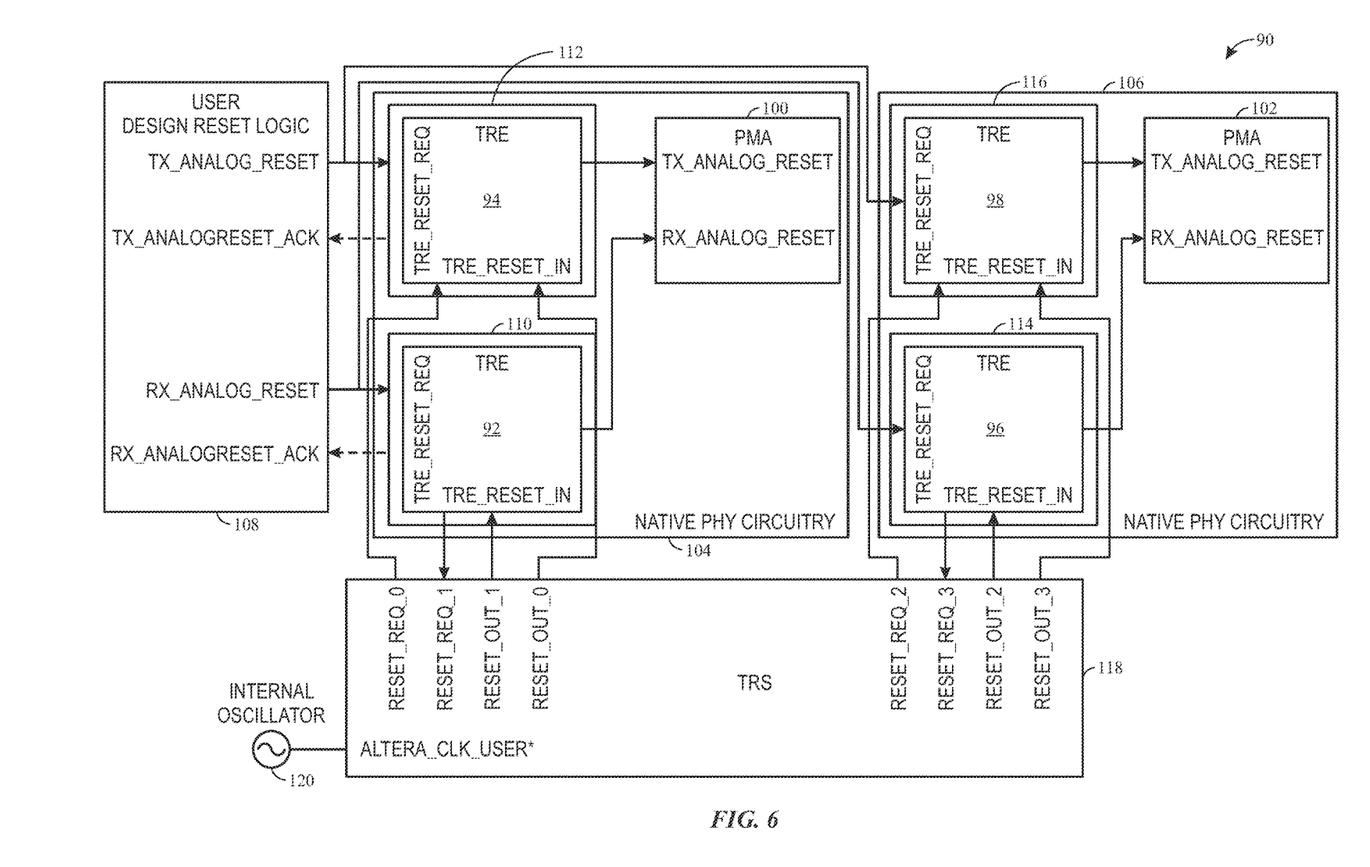
FIG. 6 is a block diagram of the circuit design of FIG. 4 including a reset sequencer inserted by the compilation software and connections between the reset sequencer and the circuitry components established during synthesis, in accordance with an embodiment.

During synthesis performed by the compilation software 28 executed by the processor 30, the processor 30 may detect the existence of the instances of the TREs 92, 94, 96, and 98, as shown by boxes 110, 112, 114, and 116 in FIG. 5. As a result, the processor 30 may automatically instantiate transceiver reset sequencer (TRS) 118 in the circuit design 90, as shown in FIG. 6. It should be understood that synthesis may include creating look-up tables (LUTs), gates, registers (e.g., flip-flops), and the like based on the circuit design. In some instances, the first circuit design 26 is provided as an RTL description by the user. As may be appreciated, RTL description is used in hardware description languages like Verilog and Very High Speed Integrated Circuit (VHSIC) Hardware Description Language (VHDL) to create high level representations of a circuit. The RTL description may model the flow of a signal between registers and combinational elements (e.g., logical operators, such as LUTs and/or gates) in a circuit design. Thus, provided with the RTL description, synthesis may generate the registers and/or combinational logic elements included in the circuit design. Synthesis also maps the logic to the underlying target FPGA architecture or the underlying technology library in ASIC designs.

Further, the processor 30 may connect the output from each TRE 92, 94, 96, and 98 to a reset input of the TRS 118 and connect each output of the TRS 118 to the reset input of every TRE 92, 94, 96, and 98 in the circuit design 90. In some embodiments, the processor 30 may also connect each output of the TRS 118 to the user reset design logic 108. If the user does not provide any clock to the TRS 118, an internal oscillator 120 may be instantiated in the TRS 118 to clock the logic.

Figure 7:
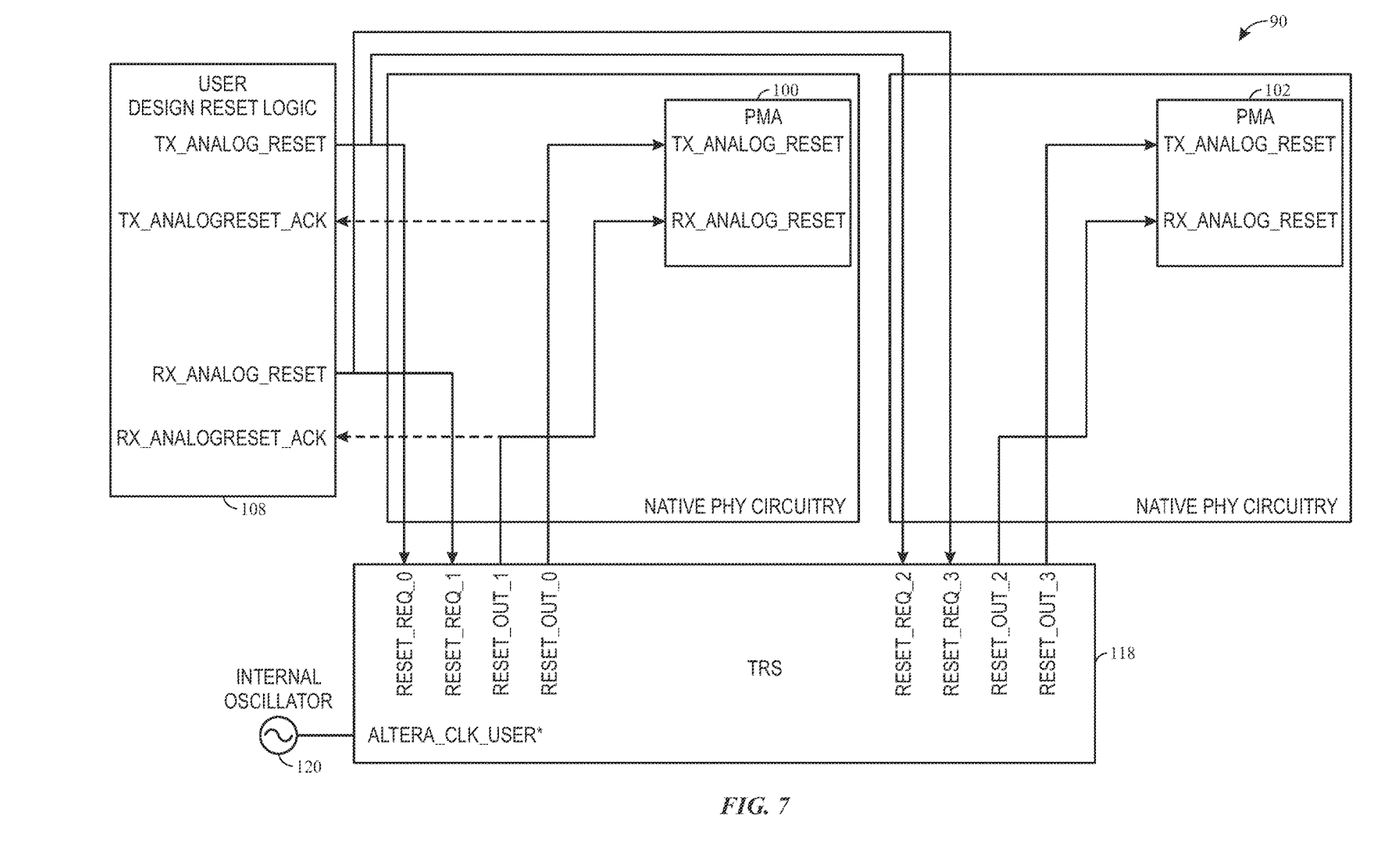
FIG. 7 is a block diagram showing post-synthesis connections and an internal oscillator, in accordance with an embodiment.

FIG. 7 is a block diagram of FIG. 6 including post-synthesis connections and the internal oscillator 120, in accordance with an embodiment. As depicted, after synthesis, each of the outputs of the TRS 118 are connected to the corresponding analog reset input of the PMAs 100 and 102 and the reset acknowledgement inputs of the user reset design logic 108. For example, RESET_OUT_0 output of the TRS 118 is connected to RX_ANALOG_RESET input of the PMA 100 and to RX_ANALOGRESET_ACK of the user reset design logic 108. Also, RESET_OUT_1 output of the TRS 118 is connected to TX_ANALOG_RESET of the PMA 100 and to TX_ANALOGRESET_ACK of the user reset design logic 108. Further, the reset request outputs of the user reset design logic 108 are connected to the corresponding reset request inputs of the TRS 118. For example, TX_ANALOG_RESET output of the user reset design logic 108 is connected to RESET_REQ_0 input of the TRS 118, and RX_ANALOG_RESET output of the user reset design logic 108 is connected to RESET_REQ_1 input of the TRS 118.

As depicted, the TRS 118 receives reset requests from external reset control logic on the RESET_REQ input ports. As described in detail below, the TRS 118 may examine the request inputs using a scheduling scheme (e.g., round-robin) and assert or deassert the signals from the corresponding RESET_OUT output ports accordingly. Various parameters may be used by the TRS 118 when scheduling the resets. For example, a first parameter (e.g., RESET_SEPARATION_NS) may specify the minimum separation between the assertion or deassertion of any two reset outputs. A second parameter (e.g., CLK_FREQ_IN_HZ) may specify the input clock frequency in Hertz that is used to calculate counter sizes and count values for reset staggering. A third parameter (e.g., NUM_RESETS) may specify the number of reset inputs to sequence. The third parameter may directly affect the width of the RESET_REQ input and RESET_OUT output ports. A fourth parameter (e.g., STRING) may store information about the reset endpoints connected or to be connected to the reset sequencer. This parameter may be populated after the reset modules are discovered during synthesis. A fifth parameter (e.g., COUNT) may specify the number of reset request inputs and reset outputs to provide.

Further, the reset sequencer may use a number of ports in accordance with embodiments. For example, a first receiver sequencer port (e.g., ALTERA_CLK_USER) may provide the clock for the reset sequencer. A second receiver sequencer port (e.g., RESET_REQ) may provide one bit for each reset request input. In some embodiments, the inputs are assumed to be asynchronous to the clk and are synchronized internally. These inputs may be provided by the reset endpoints located in the native PHY circuitry layers. A receiver sequencer third port (e.g., RESET_OUT) provides the sequenced reset outputs. These outputs are registered and are synchronized to the clk input pin. The time between each assertion and deassertion of these outputs are ensured to be no less than the RESET_SEPARATION_NS nanoseconds apart, in some embodiments.

The receiver endpoints may use a number of ports in accordance with embodiments. A first receiver endpoint port (e.g., CLK_IN) receives reset request input from a user reset design logic. A second receiver endpoint port (e.g., RESET_REQ_OUT) outputs reset signals to the reset sequencer. A third receiver endpoint port (e.g., RESET_ACK_IN) receives acknowledge inputs from the reset sequencer. A fourth receiver endpoint port (e.g., RESET_OUT) outputs reset signals to the circuitry component (e.g., PMA).

Figure 8:
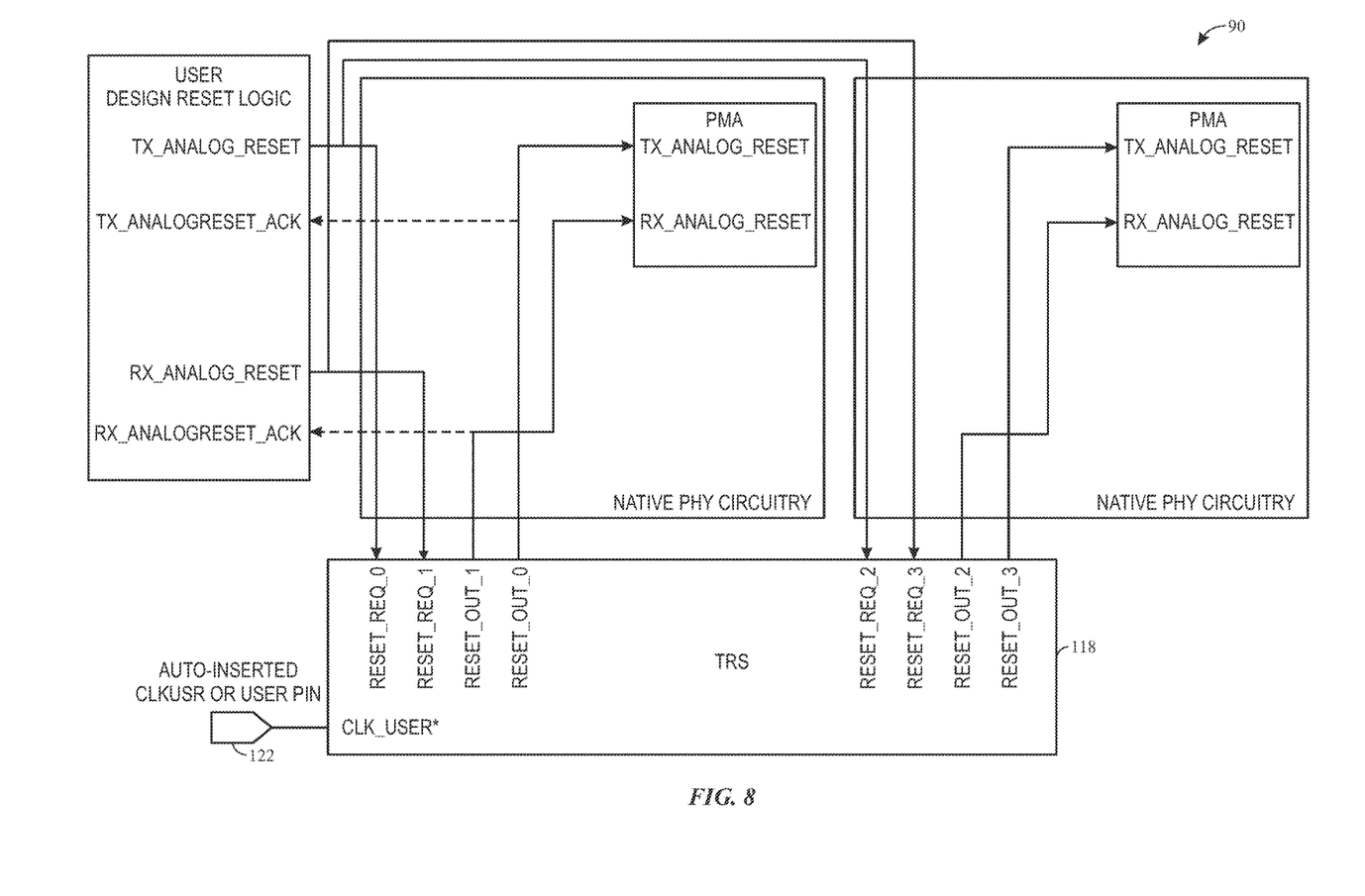
FIG. 8 is a block diagram showing post-fitter connections and an inserted clock, in accordance with an embodiment.

In some embodiments, during fitting, for example, the internal oscillator 120 may be replaced with fitter inserted CLKUSR pin or user pin 122, as shown in FIG. 8. The compilation software 28 may automatically connect the clk_user input of the TRS 118 to the CLKUSR input pin 122 on the integrated circuit device 14. The TRS 118 may use a 100 megahertz (MHz) to 125 MHz clock.

Figure 9:
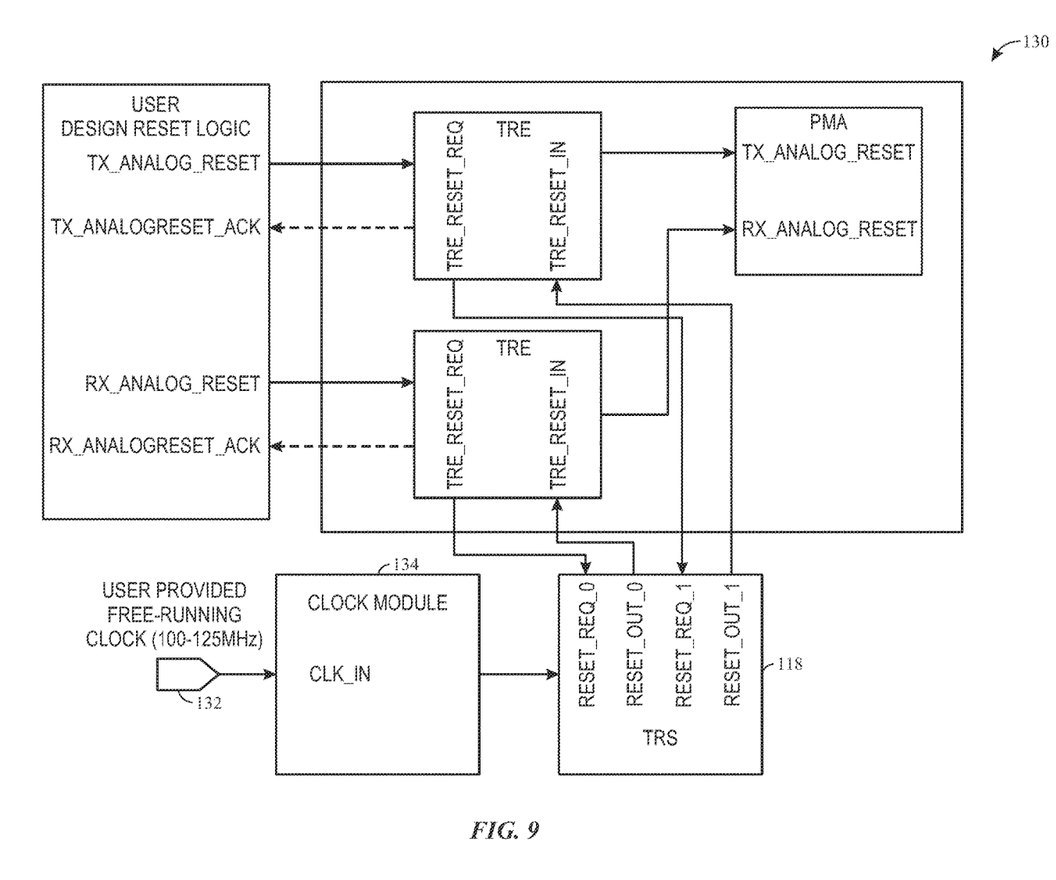
FIG. 9 is a block diagram of a circuit design including a reset sequencer connected via a manual clock connection using a clock module, in accordance with an embodiment.

FIG. 9 is a block diagram of a circuit design 130 including TRS 118 connected via a manual clock connection 132 using a clock module 134, in accordance with an embodiment. This embodiment may be beneficial when the user desires to provide their own clock as opposed to the automatic connection of the input of the TRS 118 to the CLKUSR pin 122. The clock module 134 instance may be manually created.

Figure 10:
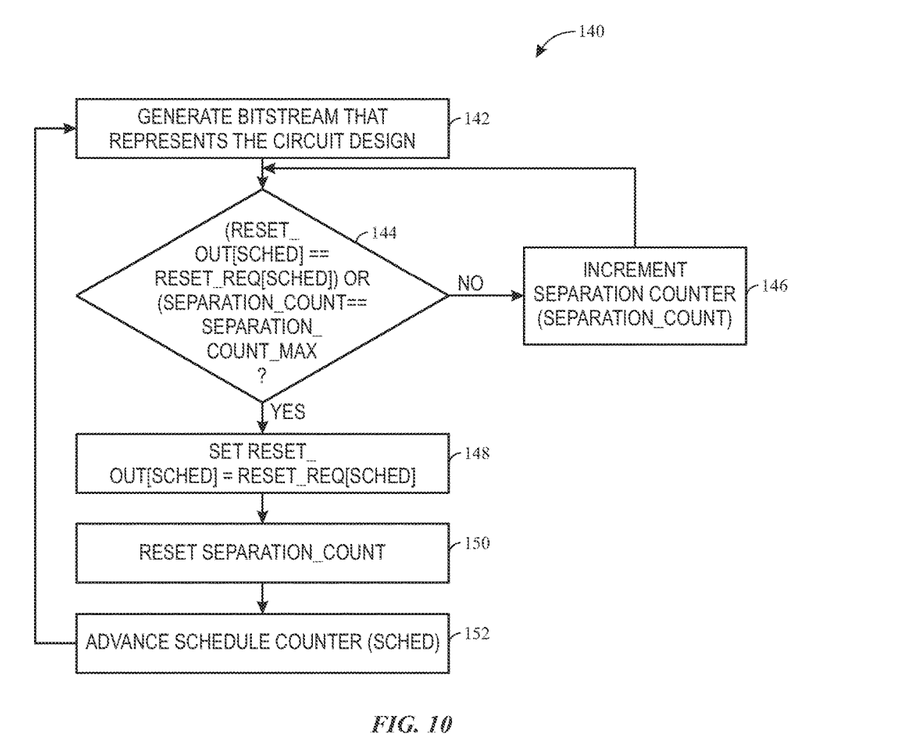
FIG. 10 is a flow diagram of a process for scheduling the resets of the circuitry components, in accordance with an embodiment.

Turning now to an embodiment of how the reset sequencer schedules the resets, FIG. 10 is a flow diagram of a process 140 for scheduling the resets of the circuitry components. Although the process 140 is an example of a round robin scheduling scheme, it should be noted that any suitable scheduling scheme (e.g., priority, first in first out, last in first out) may be used. The process 140 may begin by initializing (circuitry component 142) the reset and schedule counters. In some embodiments, the schedule counter may be initialized to zero. The process 140 may include determining (circuitry component 144) whether the RESET_OUT[schedule counter] is equal to the RESET_REQ [schedule counter] or if the separation count has reached a maximum count number. If the neither of the questions return true, then the process 140 includes incrementing (circuitry component 146) the separation counter to continue waiting for elapsed separation time.

If either of the questions return true, then the process 140 may include setting (circuitry component 148) the RESET_OUT[schedule counter] to the RESET_REQ[schedule counter] (e.g., setting the reset out output to the reset request value). Also, the process 140 may include resetting (circuitry component 150) the separation count and advancing (circuitry component 152) the schedule counter to the next request and returning to the decision circuitry component 144.

Figure 11:
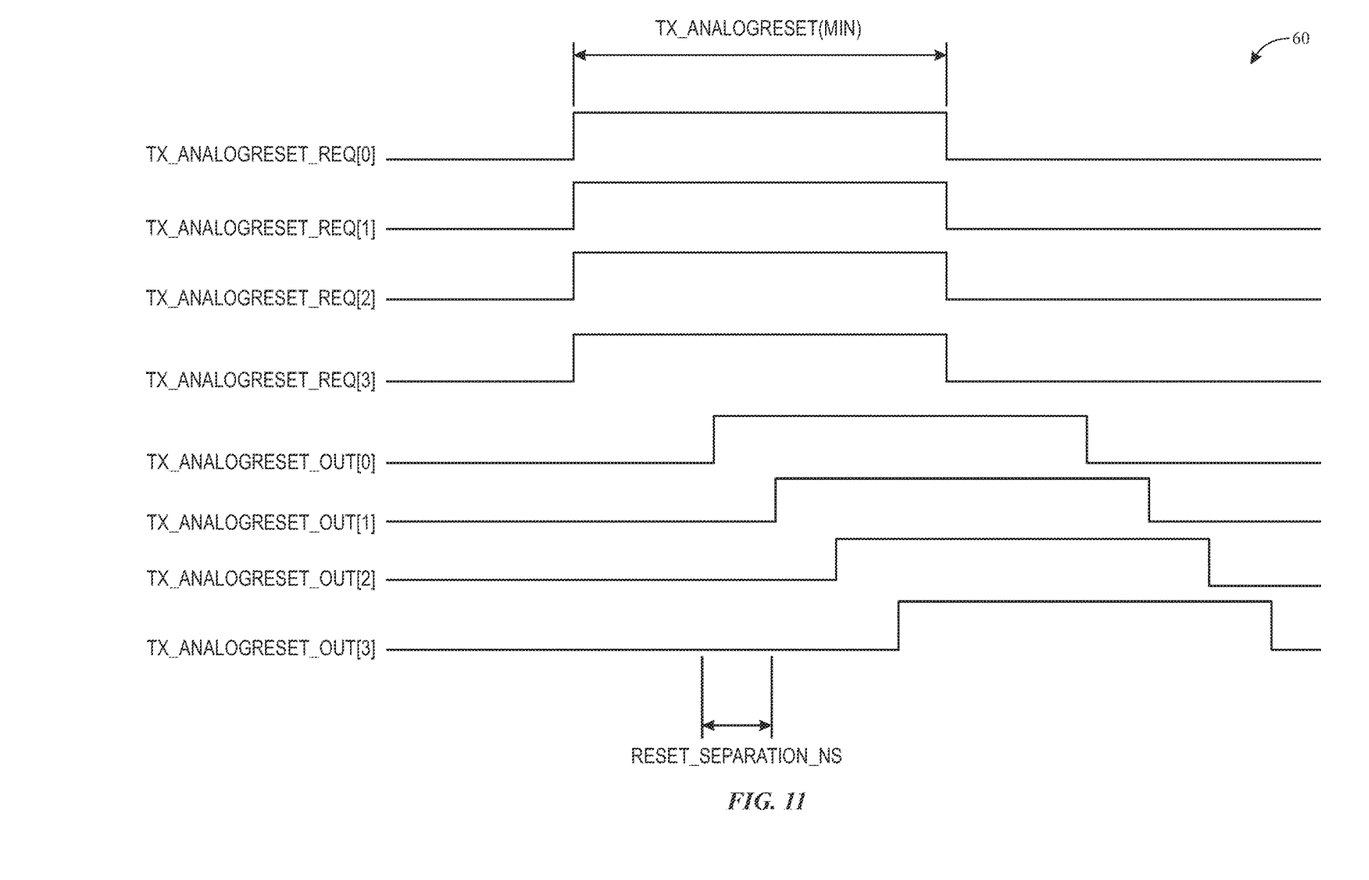
FIG. 11 is an example waveform of scheduling the resets to reduce noise in the power distribution network using a minimum separation time between reset assertion or deassertion, in accordance with an embodiment.

FIG. 11 is an example waveform 60 of scheduling the resets to reduce noise in the power distribution network 16 using a minimum separation time between reset assertion or deassertion, in accordance with an embodiment. The reset sequencer may accept reset requests (e.g., tx_analogreset_req[0], tx_analogreset_req[1], tx_analogreset_req[2], tx_analogreset_req[3]) at substantially the same time from the user reset design logic and sequence the reset outputs with a minimum separation time between each assertion or deassertion. In the depicted example, the "tx_analogreset_req[0 . . . 3]" signals are the reset request inputs to the reset sequencer from the reset endpoints. The "tx_analogreset_out[0 . . . 3]" signals are the acknowledgement outputs to the reset endpoint. The waveform 60 shows that although simultaneous request are received, the reset acknowledgements are staggered. For example, the assertion of the tx_analogreset_output[0] signal and the tx_analogreset_out[1] signal are separated by RESET_SEPARATION_NS, which may be a configurable minimum time delay (e.g., 100 to 500 nanoseconds). In the depicted embodiment, the RESET_SEPARATION_NS is set to 200 nanoseconds between each assertion and deassertion, but is should be understood, that any suitable minimum time may be used as the delay.

It should be appreciated that the disclosed embodiments provide numerous advantages and benefits. For example, some of the disclosed embodiments allow the user to continue to treat each hard circuitry instance in the circuit design as a separate entity without consideration of the other instances in the circuit design. That is, the user can avoid taking a top-down design approach to accommodate reset sequencing needs of the circuitry components. Also, the disclosed embodiments establish connections between the reset sequencer and the circuitry components without intervention from the user. The user can avoid dealing with undesirable connections between multiple hard circuitry instance and a top level reset sequencer. This may be particularly helpful when the sequencer has been identified as beneficial after the user's design has already been created.

In addition, some of the disclosed embodiments provide a handshake or acknowledgement signal back to the user's design reset logic so the user is made aware that their reset assertion or deassertion has been accepted. As a result, the user design reset logic may move on to subsequent events.

Further, other noise-producing non-reset events may be handled using the disclosed embodiments to schedule the non-reset events and reduce noise in the power distribution network 16. That is, the same mechanisms may be used to schedule or sequence other non-reset events where the logic to perform the event would make use of the reset endpoints to request time from the reset sequencer.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A computer-implemented method, comprising:
   receiving a first circuit design for an integrated circuit device;
   determining when multiple power-drawing events are to occur at substantially the same time via one or more circuitry components of the integrated circuit device, which would have a disruptive effect on a power distribution network of the integrated circuit device, based on the first circuit design;
   generating logic that schedules the multiple power-drawing events so that the multiple power-drawing events do not occur simultaneously, wherein the logic is included in an event sequencer;
   inserting the event sequencer into the first circuit design during compilation to create a second circuit design; and
   implementing the second circuit design on the integrated circuit device.

2. The computer-implemented method of claim 1, comprising:
   identifying any reset endpoints instantiated in the first circuit design; and
   establishing connections for reset requests and reset acknowledgements between the reset endpoints and the event sequencer.

3. The computer-implemented method of claim 2, wherein the reset endpoints are instantiated for every analog reset input of each of the one or more circuitry components of the integrated circuit device by a respective native physical intellectual property layer encapsulating each of the one or more circuitry components of the integrated circuit device.

4. The computer-implemented method of claim 2, wherein each of the reset endpoints are connected to a respective reset input of the one or more circuitry components.

5. The computer-implemented method of claim 1, wherein inserting the event sequencer into the first circuit design comprises synthesizing the event sequencer with fabric resources of the integrated circuit device.

6. The computer-implemented method of claim 1, wherein the multiple power-drawing events comprise dynamic reset, dynamic circuit reconfiguration, external clock changes, or some combination thereof.

7. The computer-implemented method of claim 1, comprising instantiating an internal oscillator to clock the logic in the second circuit design when a user generated clock is not specified.

8. The computer-implemented method of claim 1, parameterizing, during compilation, the event sequencer for any number of reset endpoints included in the first circuit design.

9. The computer-implemented method of claim 1, wherein generating the logic comprises scheduling signal assertions and deassertions of the multiple power-drawing events by using a round robin scheduling scheme.

10. The computer-implemented method of claim 9, wherein the round robin scheduling scheme comprises spacing the signal assertions and deassertions for the multiple power-drawing events by a separation time.

11. A tangible, non-transitory computer-readable medium storing instructions that, when executed by a processor, cause the processor to:
    receive a first circuit design for an integrated circuit device;
    identify each reset endpoint instantiated in the first circuit design;
    generate reset sequencing logic included in a reset sequencer when at least one instantiated reset endpoint is identified, wherein the reset sequencing logic reduces noise in a power distribution network shared by one or more circuitry components of the integrated circuit device by scheduling the reset endpoints of the circuitry components so that two reset endpoints do not occur substantially simultaneously;
    insert the reset sequencer into the first circuit design during compilation to create a second circuit design; and
    implement the second circuit design on the integrated circuit device.

12. The computer-readable medium of claim 11, wherein the instructions, when executed by the processor, cause the processor to establish, during compilation, reset request and reset acknowledge connections between each reset endpoint and the reset sequencer.

13. The computer-readable medium of claim 11, wherein the instructions, when executed by the processor, cause the processor to establish, during compilation, reset acknowledge connections between the reset sequencer and user design reset logic.

14. The computer-readable medium of claim 11, wherein the instructions, when executed by the processor, cause the processor to connect a clock input of the reset sequencer to a clock user device pin of the integrated circuit device.

15. The computer-readable medium of claim 11, wherein the instructions, when executed by the processor, cause the processor to schedule resets of the circuitry components so that two resets do not occur substantially simultaneously by staggering reset assertion and reset deassertion signals by a separation time.

16. An integrated circuit device comprising:
    a memory storing compilation software; and
    a processor that executes the compilation software to:
    receive a first circuit design for a field programmable gate array (FPGA) or an application specific integrated circuit (ASIC);
    identify each reset endpoint instantiated in the first circuit design;
    generate reset sequencing logic included in a reset sequencer when at least one instantiated reset endpoint is identified, wherein the reset sequencing logic reduces noise in a power distribution network shared by one or more circuitry components of the FPGA or ASIC by scheduling reset endpoints for the circuitry components a separation time apart from each other;

insert the reset sequencer into the first circuit design to create a second circuit design;

establish reset request and reset acknowledge connections between each reset endpoint and the reset sequencer without user intervention; and implement the second circuit design on the FPGA or ASIC.

17. The integrated circuit device of claim 16, wherein scheduling resets of the circuitry components a separation time apart from each other comprises scheduling reset assertions and reset deassertions at least 200 nanoseconds apart from each other.

18. The integrated circuit device of claim 16, wherein the processor executes the compilation to connect a clock input of the reset sequencer to a clock user device pin of the FPGA or the ASIC.

* * * * *